United States Patent [19]
Held

[11] Patent Number: 5,889,988
[45] Date of Patent: Mar. 30, 1999

[54] DEBUGGER FOR DEBUGGING TASKS IN AN OPERATING SYSTEM VIRTUAL DEVICE DRIVER

[75] Inventor: James P. Held, Portland, Oreg.

[73] Assignee: Intel Corporation, Santa Clara, Calif.

[21] Appl. No.: 748,551

[22] Filed: Nov. 8, 1996

Related U.S. Application Data

[63] Continuation of Ser. No. 367,933, Jan. 3, 1995, abandoned.

[51] Int. Cl.$^6$ ........................................................ G06F 9/00
[52] U.S. Cl. ........................ 395/673; 395/500; 395/677
[58] Field of Search ................................... 395/673, 677, 395/500, 674

[56] References Cited

U.S. PATENT DOCUMENTS

| | | |
|---|---|---|
| 3,602,703 | 8/1971 | Polenz . |
| 5,283,900 | 2/1994 | Frankel et al. . |
| 5,321,828 | 6/1994 | Phillips et al. ........................... 395/500 |
| 5,414,848 | 5/1995 | Sandage et al. ......................... 395/650 |
| 5,721,922 | 2/1998 | Dingwall .................................. 395/673 |

*Primary Examiner*—Majid A. Banankhah
*Attorney, Agent, or Firm*—Blakely, Sokoloff, Taylor & Zafman LLP

[57] ABSTRACT

A debugger that is multi-task aware and capable of providing symbolic support to a graphical user interface (GUI) is disclosed. The debugger disclosed communicates with a multi-tasking kernel nested within a driver of the operating system within the 0 privilege level. The multi-tasking kernel distinguishes among the rest of its environment where a graphical user interface executes the driver tasks being debugged. The multi-tasking kernel, in cooperation with the debugger runs each element on a different thread of the same machine, thereby allowing the debugger and the driver tasks being debugged to continue to run without stopping operation of either the graphical user interface or the operating system associated with the graphical user interface.

19 Claims, 8 Drawing Sheets

DEBUGGER FOR DEBUGGING TASKS IN AN OPERATING SYSTEM VIRTUAL DEVICE DRIVER

This is a Continuation Application of Application Ser. No. 08/367,933, filed Jan. 3, 1995, now abandoned.

BACKGROUND OF THE INVENTION

1. Field of Invention

The present invention relates to the field of debuggers for computers. In particular, the present invention describes a debugger for debugging tasks in an operating system virtual device driver.

2. Description of Related Art

Business communications such as video conferencing require support for natural data type (NDT) processing, i.e., interacting with the user using video and audio data. A distinguishing characteristic of audio and video is that it is captured and presented in real-time. Any delay in the capture or playback of audio and video is very noticeable to the user as clicks, pops, or jerkiness. Further, playback of audio and video must be synchronized with each other to appear natural.

Previously, computer systems supported NDT processing by including a specialized digital signal processing (DSP) processor. The computer system's main processor (host processor) interacted with the DSP processor. The DSP processor performed real-time tasks, such as audio capture and playback, while the host processor executes the operating system. However, the growth of computer system processing power allows host processors to process NDT, but the non-real-time nature of volume desktop operating systems, such as DOS/Windows 3.x, from Microsoft Corporation of Redmond, Wash., is a remaining barrier. Windows, for example, is designed for GUI interaction and does not provide the facilities needed for real-time programming.

The SPOX™ software architecture is one example of a real-time environment for DSP processors, that provides Windows 3.x with real-time data processing support through additional hardware. The IA-SPOX™ software architecture is a version of SPOX that runs directly on the host microprocessor as a Windows virtual device driver (VxD) instead of on an additional DSP processor. This means that real-time tasks can execute with Windows 3.x. It allows the increasing host processing power to be used for natural data type processing and communications. For example, a Pentium™ processor can simultaneously support Windows 3.x and voice digitization.

An important element of the IA-SPOX architecture is the provision of an environment for development that facilitates the migration from digital signal processors (DSPs) and original development of applications. Existing compilers and linkers provide part of the tools needed, but existing debuggers available for the VxD environment, where IA-SPOX runs, are system level debuggers designed for supporting the development of device drivers.

To increase the likelihood of the widespread adoption of IA-SPOX, IA-SPOX should include a debugger. Therefore, what is needed is a debugger that more fully supports the debugging of tasks in an operating system device driver.

SUMMARY OF THE INVENTION

A debugger that is aware of the multi-tasking capabilities of a real-time multitasking environment nested within a driver of the operating system is disclosed. The real-time multi-tasking environment is nested within and distinct from the operating system multi-tasking facilities. The debugger utilizes the multitasking capabilities of this nested environment to simultaneously run an operating system graphical user interface (GUI), the task or tasks being debugged, and driver resident portions of the debugger itself. All elements are simultaneously run on one machine. Thus the described debugger provides a system such that an end user can debug drivers of the operating system itself while still utilizing a graphical user friendly interface.

BRIEF DESCRIPTION OF THE DRAWINGS

The present invention is illustrated by way of example, and not limitation, in the figures. Like references indicate similar elements.

DESCRIPTION OF THE PREFERRED EMBODIMENT

OVERVIEW OF ONE EMBODIMENT OF THE PRESENT INVENTION

A debugger for debugging tasks in an operating system virtual device driver is described. In the following description, specific details are set forth such as an application program interface (API), etc., in order to provide a thorough understanding of the present invention. In other instances, known circuits, structures and techniques have not been shown in detail in order not to obscure the present invention.

In one embodiment of the present invention, a real-time operating system environment for applications running in the Windows 3.x. environment is used in conjunction with a debugger. The debugger uses virtual devices to allow non-real-time aspects of the operating system to interact with real-time tasks.

The debugger allows debugging of multiple tasks in the environment. It provides full symbolic support and GUI ease of use, comparable to Windows application debuggers. In one embodiment, this is achieved by providing a Windows-level debug interface to the real-time operating system environment, such as IA-SPOX, similar to the Microsoft Win32™ debug API, and retargeting the IAL Software Technology Lab Ultra™ debugger to it.

In one embodiment, developers (users) can edit, compile and debug IA-SPOX tasks on a single machine running Windows 3.x.

The following provides information relating to one embodiment of the present invention:

"Getting Started with SPOX," Spectron Microsystems, Inc., DN (Mar. 31, 1989).

"SPOX Programming Reference Manual," Spectron Microsystems, Inc. publication DN 80101-E (May 11, 1989).

"Adding Math Functions to SPOX [TMS320C30 Version]," Spectron Microsystems, Inc., DN 80105-B (Mar. 31, 1989).

"Compiling and Linking SPOX Programs [TMS320C30 Version]," Spectron Microsystems, Inc., DN 82018-A (May 31, 1989).

"SPOX-RTK User's Guide [TMS320C30 Version]," Spectron Microsystems, Inc., DN 82016-B (May 31, 1989).

"SPOX-RTK Reference Manual [TMS320C30 Version]," Spectron Microsystems, Inc., DN 82017-B (May 31, 1989).

"SPOX-RTK Installation Notes [TMS320C30 Version]," Spectron Microsystems, Inc., DN 82015-A (May 31, 1989).

"SPOXXDS User's Guide," Spectron Microsystems, Inc., DN80103-C (May 31, 1989).

"The C Programming Language," Kernighan and Ritchie, 2nd Edition, Prentice Hall, Englewood Cliffs, N.J. 07632 (1988).

"Microsoft Virtual Device Adaptation Guide," Microsoft Corp., Redmond, Wash., 1991. pp. 7–12.

"iRMK™ 1.1 Real-Time Kernel Reference Manual," Order Number: 4609810-001, Intel Corporation, Hillsboro, Oreg.

"Virtual Device Adaptation Guide: For the Microsoft Windows Operating System," Microsoft Corporation, Redmond, Wash.

"Microsoft Win32 Programmer's Reference," Microsoft Press, Redmond, Wash., 1993.

"Soft-ICW/W Reference Guide, Nu-Mega Technologies, Inc., Nashua, N.H.

COMPUTER SYSTEM

Figure 1:
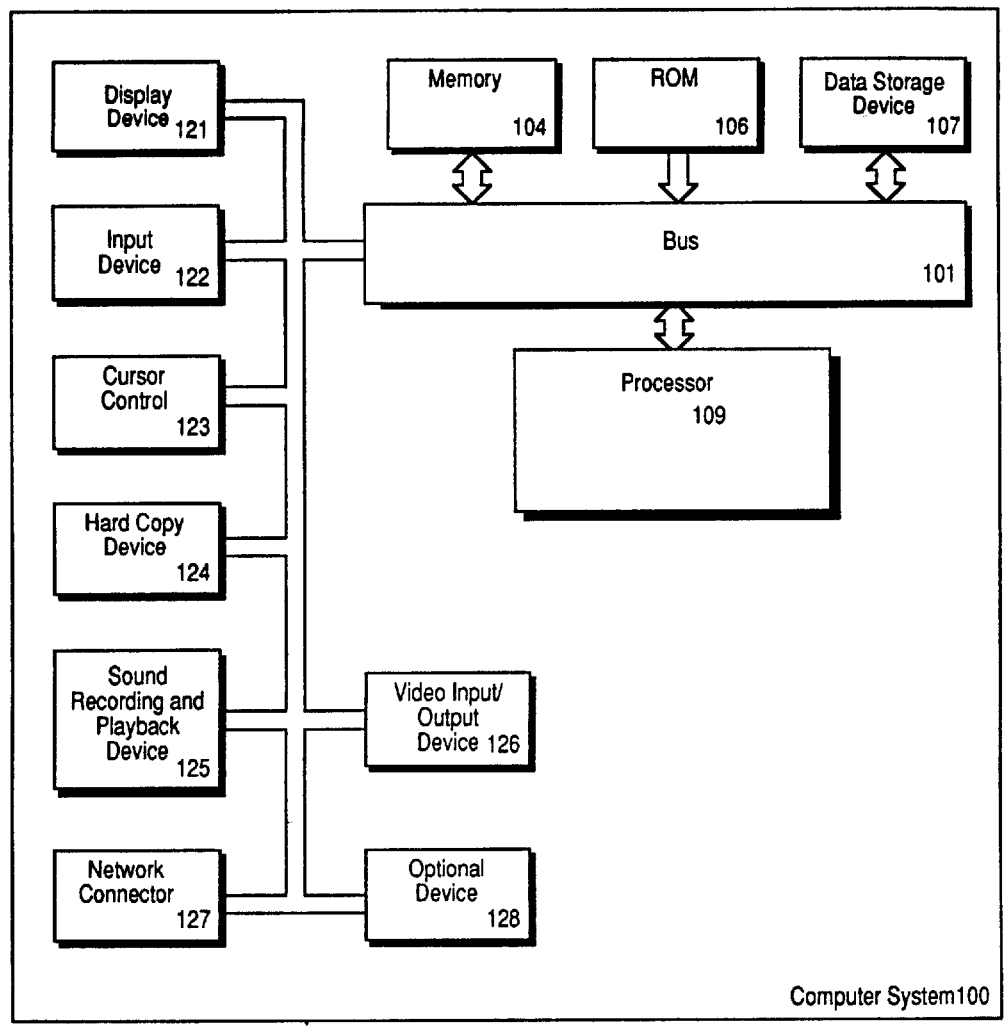
FIG. 1 illustrates a computer system upon which one embodiment of the present invention can be implemented.

FIG. 1 illustrates a computer system 100 upon which an embodiment of the present invention can be implemented. Computer system 100 includes a bus 101, or other communications hardware and software, for communicating information, and a processor 109 coupled with bus 101 for processing information. Processor 109 can be a single processor or a number of individual processors that can work together. Computer system 100 further includes a memory 104. Memory 104 can be random access memory (RAM), or some other dynamic storage device. Memory 104 is coupled to bus 101 and is for storing information and instructions to be executed by processor 109. Memory 104 also may be used for storing temporary variables or other intermediate information during execution of instructions by processor 109. Computer system 100 also comprises a ROM 106 (read only memory), and/or some other static storage device, coupled to bus 101. ROM 106 is for storing static information.

Computer system 100 can optionally include a data storage device 107, such as a magnetic disk, a digital tape system, or an optical disk and its corresponding disk drive. Data storage device 107 can be coupled to computer system 100 via bus 101.

Computer system 100 can also include a display device 121 for displaying information to a computer user. Display device 121 can be coupled to bus 101. Display device 121 can include a frame buffer, specialized graphics rendering devices, a cathode ray tube (CRT), and/or a flat panel display. Bus 101 can include a separate bus just for display device 121.

An alphanumeric input device 122, including alphanumeric and other keys, is typically coupled to bus 101 for communicating information such as command selections to processor 109 from a user. Another type of user input device is cursor control 123, such as a mouse, a trackball, a pen, a touch screen, a touch pad, a digital tablet, or cursor direction keys for communicating direction information to processor 109, and for controlling cursor movement on display device 121. This input device typically has two degrees of freedom in two axes, a first axis (e.g., x) and a second axis (e.g., y), which allows the device to specify positions in a plane. However, this computer system is not limited to input devices with only two degrees of freedom.

Another device which may be optionally coupled to bus 101 is a hard copy device 124 which may be used for printing instructions, data, or other information on a medium such as paper, film, slides, or other types of media.

A sound recording and/or playback device 125 can optionally be coupled to bus 101. For example, sound recording and/or playback device 125 can include an audio digitizer coupled to a microphone for recording sounds. Further, sound recording and/or playback device 125 may include speakers which are coupled to digital to analog (D/A) converter for playing back sounds.

A video capture device 126 can optionally be coupled to bus 101. This video capture device 126 can be used to digitize video images from, for example, a TV, a VCR, and/or a video camera. Video capture device 126 can include a scanner for scanning printed images.

Also, computer system 100 can be part of a computer network (e.g., a LAN) using the optional network connector 127 being coupled to bus 101. In one embodiment of the present invention, the entire network can then also be considered to be part of computer system 100.

Optional device connector 128 can optionally be coupled to bus 101. Optional device connector 128 can include, for example, a PCMCIA card adapter. The optional device connector 128 can further include an optional device such as modem or a wireless network connection.

REAL-TIME SUPPORT FOR WINDOWS

Figure 2:
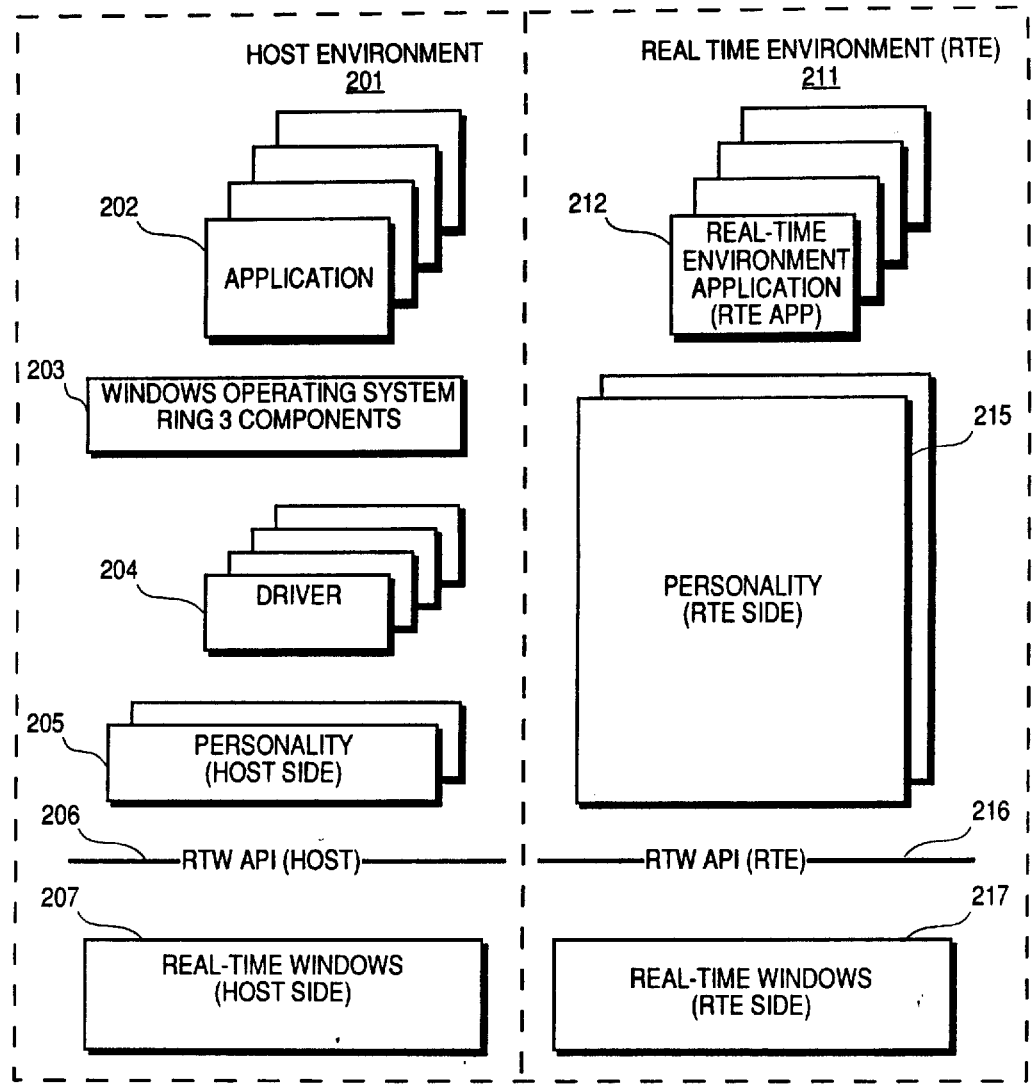
FIG. 2 illustrates a architecture having a debugger.
Figure 3:
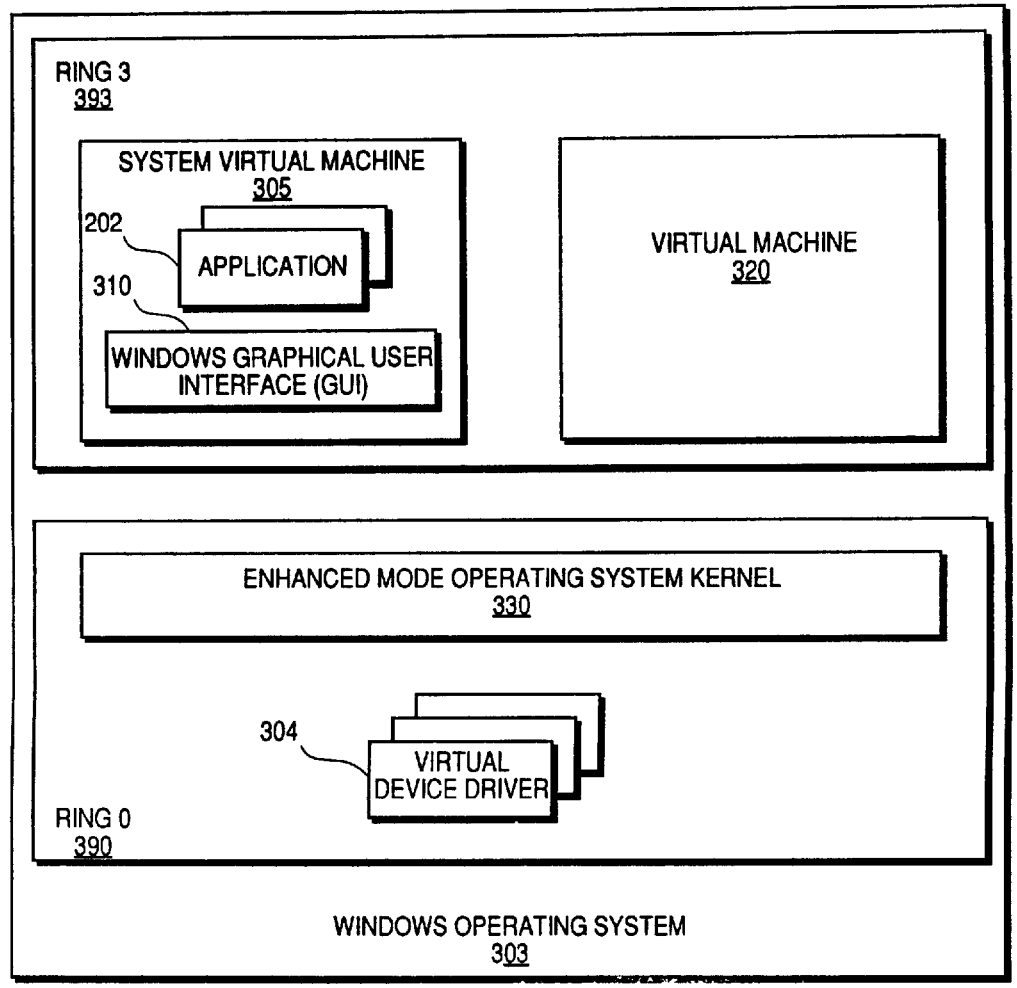
FIG. 3 illustrates a non-real-time operating system architecture.

FIG. 2 illustrates an architecture having a debugger. In this embodiment, a non-real-time operating system, such as DOS/Windows 3.x, is used and a real-time architecture is included, such as the IA-SPOX™ architecture. FIG. 3 illustrates a non-real-time operating system architecture such as Windows 3.x.

The host environment 201 includes the system virtual machine 305 (see FIG. 3). The system virtual machine 305 executes the Windows' graphical user interface (GUI) 310 and all the applications and dynamic link libraries (DLLs) and all other virtual machines (which execute DOS sessions). Programs that execute within virtual machines (VMs) run at ring 3 393 in a 16-bit address space. The host environment 201 includes: one or more applications such as application 202; the Windows operating system ring 3 components 203 (explained below), such as the normal enhanced-mode Windows 3.x execution environment; one or more drivers, such as driver 204; a host side personality 205 (the host side part of a personality); a real-time Windows (RTW) host API 206; and the host side real-time Windows (RTW-host side) interface 207. Driver 204 is a standard Windows operating system 303 device driver. The host side personality 205 provides an interface for the Windows drivers and applications to communicate with, and control tasks running in, the IA-SPOX environment. The host environment 201 includes a host API 206 that gives the host side personality 205 and driver 204 access to the RTW host side interface 207.

In one embodiment, the RTW host side interface 207 includes Real-Time for Windows™ (RTW). RTW is the lowest level of the IA-SPOX architecture. IA-SPOX uses RTW to add a real-time environment to the host environment 201.

FIG. 3 illustrates a non-real-time operating system architecture such as Windows 3.x. The enhanced mode operating system kernel 330 makes use of the protection levels (called rings) of Intel Architecture (IA™) processors. The lowest level of the Windows operating system 303 runs at the most privileged level, ring 0 390. The higher levels of the Windows operating system 303 run at ring 3 393. Portions of the Windows operating system 303 running at ring 0 390 include the enhanced mode operating system kernel 330, such as the Windows enhanced mode kernel (VMM-virtual machine manager), and the virtual device driver 304. Virtual device driver 304 is a Windows operating system 303 virtual device driver (VxD). In one embodiment of the present invention, applications running under the Windows operating system 303 use the virtual device driver 304 to support real-time tasks. The virtual machine manager manages virtual machines such as virtual machine 320. Virtual machine 320 can be a DOS virtual machine, for example. The virtual machine manager and the VxDs execute at ring 0 390 in a 32-bit address space. Virtual machine 320 and system virtual machine 305 execute at ring 3 393. System virtual machine 305 includes application 202 and graphical user interface 310 (GUI), such as the Windows GUI.

Programs, applications, and tasks, in the real-time environment (RTE) 211, such as real-time environment application 212, execute at ring 0 390 in a flat, 32-bit address space. They are assured real-time response. Real-time applications, such as real-time environment application 212, are 32-bit DLLs loaded and initialized by RTW.

In one embodiment, RTW provides the bridge between the host environment 201 and the real-time environment 211. FIG. 2 shows that the RTW host side interface 207 and the RTW real-time environment side interface 217 in combination (such as in RTW) are unique in that they straddle the two environments; part executes in the host environment 201 and part executes in the real-time environment 211. RTW provides the basic mechanisms necessary to support real-time programming in Windows 3.x. RTW host side interface 207 and RTW RTE side interface 217 typically include:

Task management: task creation, deletion, preemptive scheduling by priority.

Inter-Task Synchronization: several varieties of semaphores and task queue manipulation.

Time Management: alarms and task sleep.

Interrupt Management: assignment of interrupt service routines to IRQs, masking of interrupts.

Communication Channels: communication between the host environment 201 and the real-time environment 211.

Personality Initialization: allows the host environment 201 to initialize real-time environment applications and assign them resources.

Loading: module loading, linking and relocation.

RTW incorporates the Intel real-time kernel software, iRMK™ software, to provide many of its features.

PERSONALITY

RTW provides basic functionality for real-time programming, but does not provide a full set of features for DSP programming. To simplify the migration of existing DSP applications, it is desirable to provide a similar programming environment to one that is currently in use. Personality is the RTW term for an environment that provides a set of services tailored to a specific class of applications.

Figure 4:
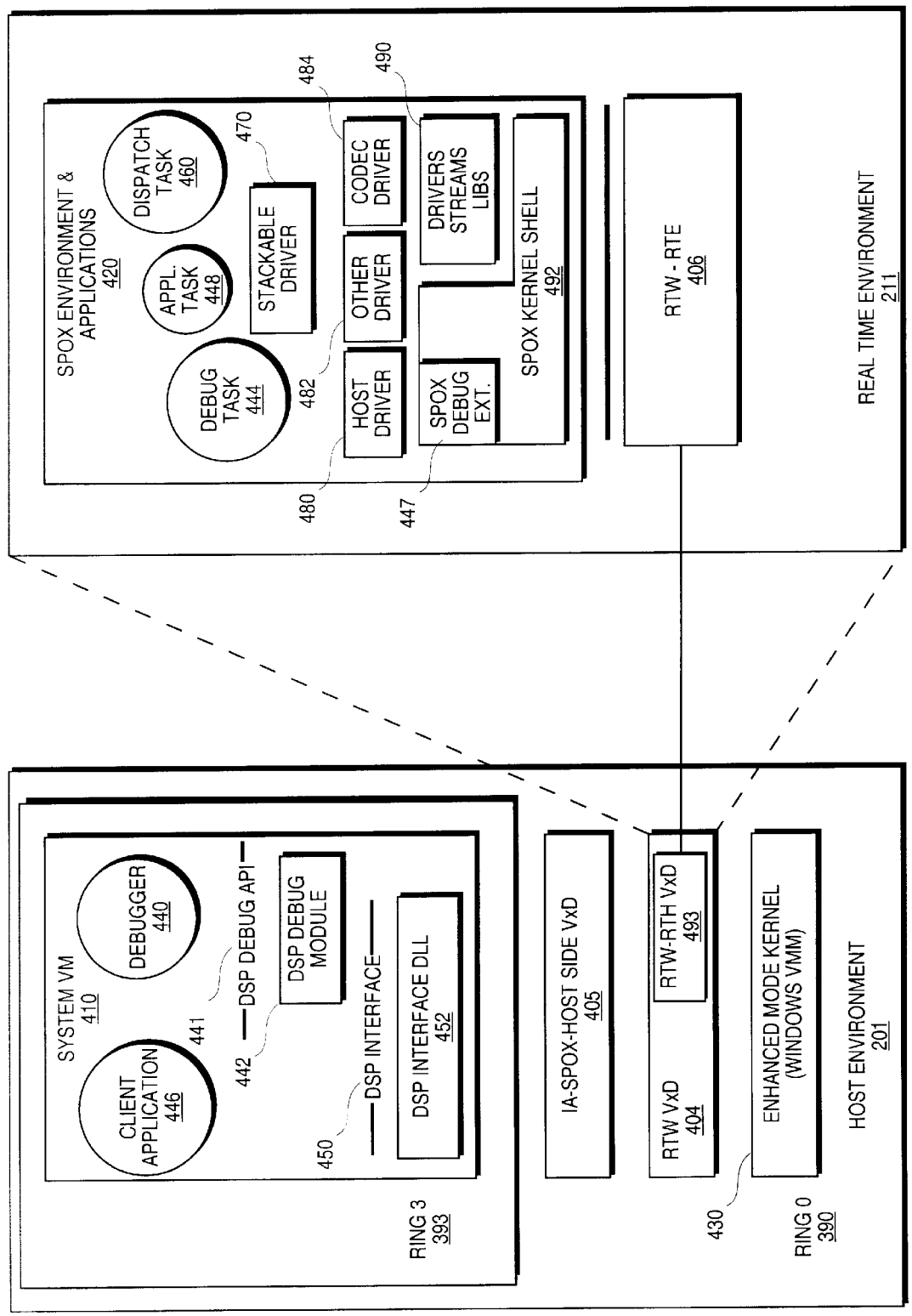
FIG. 4 illustrates a debugger using virtual devices.

FIG. 4 illustrates a debugger using virtual devices in a real-time architecture for a non-real-time operating system. In one embodiment of the present invention, SPOX environment, available from Spectron Microsystems, Inc. of Santa Barbara, can be used as the RTW personality because it is written in C and has been ported to several different DSP processors already. In one embodiment, a port of the SPOX environment to IA processors, called the IA-SPOX environment is used.

FIG. 4 shows the implementation of IA-SPOX environment as an RTW personality. The host side personality 205 is comprised of the DSP interface 450 in ring 3 393 and a IA-SPOX-host side virtual device driver 405 that provides the DSP interface 450 with a custom VxD protected mode interface. In one embodiment, the DSP interface API includes WinSPOX, from Spectron Microsystems.

The RTW host side 493 and the host-based RTE are both part of a second VxD, RTW VxD 404. The IA-SPOX host side VxD 405 uses a VxD service interface of the RTW host to load and initialize the SPOX environment and applications 420 (or IA-SPOX environment and applications).

In one embodiment, the SPOX kernel shell 492 has been re-implemented using the RTW-RTE 406 services, while the balance of IA-SPOX has been implemented using the core of SPOX. The SPOX kernel shell 492 has been extended to include the SPOX debug extension 447. This supports the recording of and the providing of information regarding the state of a task. Drivers and streams libraries 490 include support for real-time applications.

MODULES

The IA-SPOX environment and applications 420 is made up of modules that are Win32 portable executable (PE) format dynamic link libraries. Each module may contain code and data for one or more SPOX tasks, such as RTE application task 448, function libraries, such as drivers and streams libraries 490, and drivers such as other driver 482, CODEC driver 484, and stackable driver 470. Modules are all loaded by RTW into a single common address space (32 bit flat-model). Each module has its own copy of any module scope variables and static variables that are not exported. Tasks, such as debug task 444, RTE application task 448, and dispatch task 460, may load a library explicitly or implicitly by referencing a symbol exported by the library.

TASKS

In one embodiment, each task is a single thread of a separate register context and stack. Typically, all tasks share a single common address space. The dispatch task 460 looks for, and loads, a corresponding library when a DSP interface 450 client requests that a task be opened that is not currently resident. The library file typically has the same name as the task and exports the task entry point. If multiple instances of a task are created (created with the same entry point) then they share the same global variables since they are using the same library module.

DEBUGGER SUPPORT

The debug support in IA-SPOX is layered on the basic IA-SPOX environment. The additional components used include the debug task 444, the SPOX debug extension 447, the debugger 440, and optionally the DSP debug module 442. IA-SPOX environment provides a custom debug API between the debugger 440 and the DSP debug module 442. The DSP debug API 441 is built on the regular DSP interface's 450 messaging and data streaming facilities to interact with a special high priority task (debug task 444) running in the IA-SPOX environment and applications 420.

The debug task 444 receives notifications of system events and uses regular IA-SPOX kernel calls to manipulate the state of the task(s) being debugged, such as RTE application task 448. The debug task 444 uses Windows VMM services for establishing exception hooks to install exception handlers.

As part of the SPOX debug extension, key functions in the SPOX kernel shell 492 have been modified to provide further debugger support. Dynamic memory allocation is tracked and checked for memory overwrites and failure to free memory. Blocking system calls have been modified to save a snapshot of the system state for presentation to the debugger before entering the RTW kernel. This state is restored on resumption of the task. Support for compiler generated calls to a stack checking routine is provided. Finally, a task switch handler supports task specific breakpoints and a watchdog timer to prevent runaway tasks. In previous system level debuggers, these features would not typically be available to a real-time applications developer.

THE DEBUGGER

Figure 5:
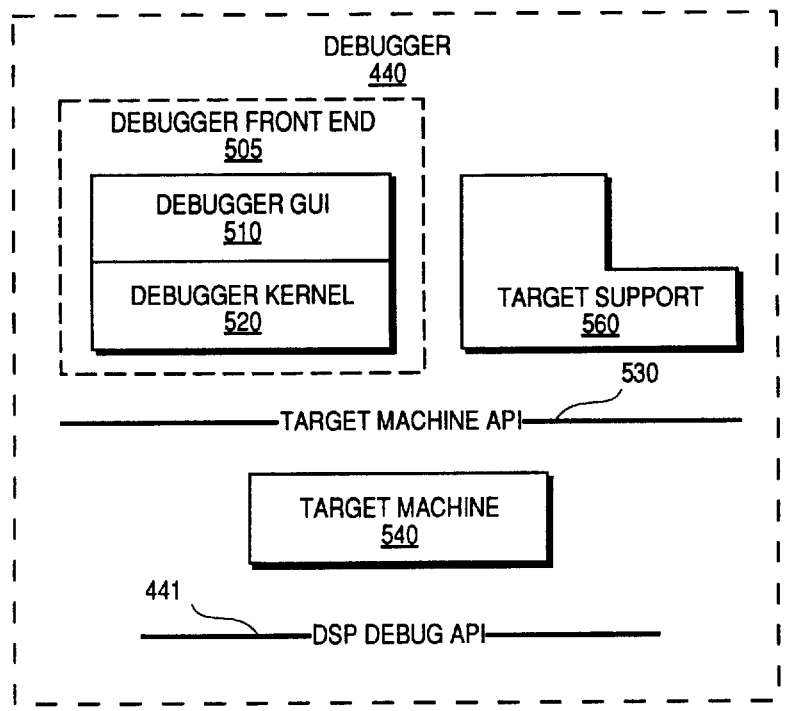
FIG. 5 illustrates a debugger.

FIG. 5 illustrates a debugger. Debugger 440 includes a debugger front end 505, target support 560, a target machine API 530, a target machine 540, and a debug API 550. The debugger front end 505 includes the debugger GUI 510 and the debugger kernel 520.

One embodiment of the present invention uses the Intel ULTRA™ debugger front end 505. The ULTRA generic debugger is designed to support a variety of debug environments and architectures. This technology was developed to concentrate common debug features into a single reusable base. The ULTRA debugger front end provides a graphical user interface 510, rich symbolic support, extensive command line, and a variety of features expected of modern debugging tools. ULTRA's modular and extensible architecture allows it to be retargeted to a variety or architectures (x86, IA, 960) as well as variety of GUI environments (Win16, Win32, X/Motif). ULTRA has been utilized by these products: ICE™-960KB software, ICE™-960SB software, DB960 software, ICE™-2501 software and now the IA-SPOX Debugger.

The debugger GUI 510 and the debugger kernel 520 are the two main components which comprise the ULTRA debugger front end. The core of the debugger GUI 510 provides generic support for a debugger's windows, menus and dialogs. This core utilizes a GUI independent library that hides the specifics of the native GUI API, allowing it to be rapidly migrated to new graphical environments. The debugger kernel 520 includes various subsystems that manage symbolic support, memory access, command line parsing, execution control, and breakpoints. The target machine API 530 provides the debugger kernel 520 with low level information critical to the debug task 444. The debugger kernel 520 remains unaware of architecture and forces this knowledge down below the API to the target machine 540. Target support 560, optionally, provides specific support for the target machine 540.

INTERFACES

In one embodiment, a special DSP debug API 441 exists between the debugger 440 and the DSP debug module 442. In one embodiment, the special DSP debug API 441 is similar to the debug portion of the Win32 API.

The DSP debug API 441 is event-based. The debugger 440 calls the DSP debug API 441 periodically to wait for debug events (with a time-out). The debug events include the creation and exit of a task, the loading and unloading of a module (e.g. DLL), text output directed to the debugger from the task, and exceptions. A debug event structure includes the task handle, and an event code and corresponding event information. Exception events contain a record that provides details about the particular exception that has occurred. The DSP debug API 441 includes functions to control task execution, query and alter a task's environment, and control the debugging process (e.g. wait for an event).

TABLE I

DSP Debug API 441 Summary

Task Execution
    dspSuspendTask - dspResumeTask
    dspGetTaskHead - dspGetTaskNext
Task State
    dspGetTaskContext - dspSetTaskContext
    dspGetTaskStatus
    dspReadTaskMemory - dspWriteTaskMemory
Debug Event Processing
    dspWaitForDebugEvent - dspContinueDebugEvent
    dspDebugInit - dspDebugShutdown
    dspInsertBreakPoint - dspRemoveBreakPoint
    dspDebugActiveTask
    dspSetDebugMode Upon receipt of an exception event, and based on the context of the user's action, the debugger 440 may suspend execution, or resume, the task to allow for further event processing. Table I summarizes one embodiment of the DSP debug API 441 functions paired where they are reciprocals or paired in use.

The IA-SPOX interfaces have also been extended to provide the debugger 440 access with calls to break to the debugger (DebugBreak) and to direct text output to the debugger (OutputDebugString). In normal operation all trace buffer output (the equivalent of console output) from the IA-SPOX environment is redirected to the debugger 440.

The target machine 540 and the target support 560 are unique to a particular debugging tool, in this case to the IA-SPOX debugger. Together with the ULTRA debugger front end, they make up a complete executable product.

In one embodiment, the IA-SPOX target machine 540 (TM) is event driven, supports a 32-bit flat model addressing, hardware and software breakpoints, and various step/go types. Architecturally, the target machine 540 sits between the debugger front end 505 and IA-SPOX environment, interfacing via the target support 560 and the DSP debug API 441, and responding to requests and events from either side. The TM 540 queries for, and handles, IA-SPOX debug events and appropriately indicates the current state to the debugger front end 505. Events are received that indicate task creation/exit, breakpoints, single steps, faults, and output. Similarly, user actions are translated by the debugger front end 505 into TM 540 requests that are then completed by calls down through the DSP debug API 441, for example: obtaining current execution point (EIP), filling the memory window, setting a breakpoint, stepping and going.

Target support 560 is a collection of subsystems that provide functionality beyond the current coverage of the target machine API 530, but remain the responsibility of the target. These subsystems support: disassembly, register formatting, MS CV4 symbol consumption, and target specific commands and dialogs.

The IA-SPOX target facilitates the debug of multiple IA-SPOX tasks and allows for task attachment, suspension or termination. Task state (EIP and current breakpoints) are saved as the user transitions from the debug of one task to another.

The implementation of IA-SPOX debugger support was designed to layer on RTW and IA-SPOX messaging and data exchange services in order to retain independence from the particular RTW real-time environment (RTE). The RTE may run on a IA coprocessor, available from Intel Corporation, add-in card processors, as well as on the host processor under Windows.

In so far as possible, special hooks into the RTW kernel and knowledge of the implementation of the IA-SPOX environment have been avoided.

The resulting design makes use of multi-tasking features of the IA-SPOX environment. All notifications are accomplished as messages to and from a highest-priority debug task.

DEBUGGER TASK COMMUNICATIONS

Figure 6:
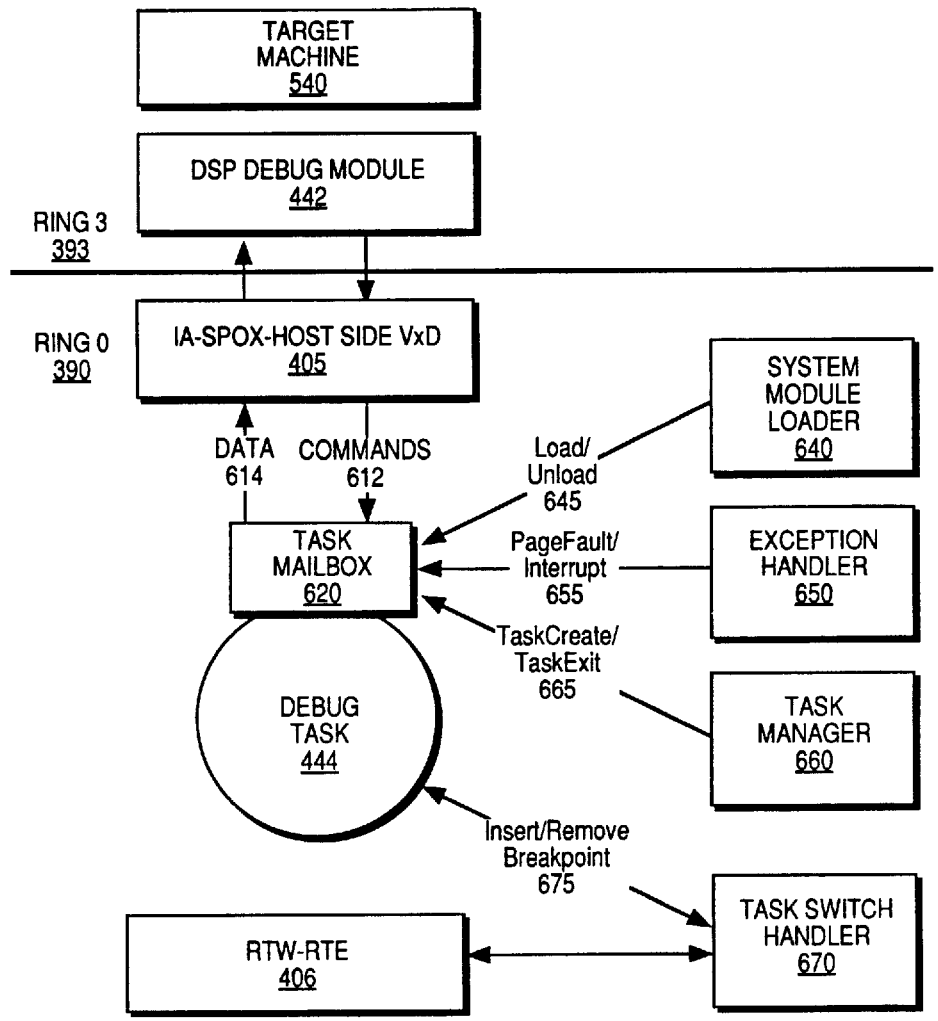
FIG. 6 illustrates communications used by a debug task.

FIG. 6 illustrates communications used by a debug task 444.

The target machine 540 issues commands, via the DSP debug module 442 and through the IA-SPOX host side VxD 405, to control a task being debugged using the debug task mailbox 620. Data, such as a task context or task memory contents, are exchanged via a stream. The debug task mailbox 620, in one embodiment, is a portion of memory that enables multiple tasks to read from and write to the portion of memory. Note that in one embodiment, the debug task mailbox 620 represents the same method of communications used between other tasks in the real-time environment 211. The task mailbox(es) 620 and streams used are facilities provided to all tasks launched through the DSP interface 450. That is, no special communications techniques were needed for tasks to communicate with the debug task 444. In one embodiment, the debug task mailbox 620 is implemented using standard streams and multiple standard mailboxes (e.g. one mailbox for receiving information and one mailbox for transmitting information).

Debug events generated from within the IA-SPOX environment are handled by the debug task mailbox 620. The system module loader 640 sends messages indicating load events load/unload 645 and the task manager 660 sends notification messages concerning task creation and exits.

The debug task 444 also fields messages from software interrupt handlers (ISRs), such as exception handler 650, to provide for the catching of exceptions such as page faults 655. The ISRs simply post a message to the debug task 444 and suspend their current task. The debug task then notifies the debugger 440 of the exception and eventually kills or resumes the task after the user has altered its context.

One embodiment of the present invention does not allow debugging of hardware interrupt service routines. In another embodiment, hardware interrupts could be handled by a context switch to a very high-priority task context in the interrupt dispatching code.

A notion of a debugger accessible context for each task is implicit in the DSP debug API 441. This requires the most intrusive behavior on the part of the debugger 440 support in the IA-SPOX environment. The underlying RTW kernel does not keep explicit state for performance reasons. The registers of a task are stored implicitly on the stack as the task enters the kernel and retrieved on return. There is no register state to present to the debugger 440.

The blocking calls in the IA-SPOX environment are therefore wrapped with a context store on entry and restored on exit. That context is presented to the debugger 440. Since the debugger 440 must be able to attach to a running task, this information must be stored for every task in the system when running the debugger 440.

Real-time applications written in the IA-SPOX environment commonly share a great deal of code in the form of drivers and libraries. Since all IA-SPOX tasks run in the same memory context, hardware and software breakpoints set in any of this shared code would be triggered by all tasks. The implicit switching of breakpoints with memory context switching does not exist in the IA-SPOX environment. The debugger 440 support thus includes a final major component, a task switch handler 670.

The task switch handler is responsible for switching tasks in the RTE 211. The task switch handler 670 provides a set of hardware debug registers and software breakpoints to each IA-SPOX task. It also resets a watchdog timer that prevents ill-behaved tasks from holding the processor indefinitely (as long as they do not disable hardware interrupts and prevent the timer from running). This is a significant improvement over system level debuggers because a ill-behaved task may permanently hang the main processor which is also running the system level debugger. The task switch handler 670 communicates directly with the RTW-RTE 406. The task switch handler 670 shares a data structure with the debug task 444. This allows the debug task to notify the task switch handler 670 to insert breakpoints into, and remove breakpoints from 675, specific tasks.

One embodiment of the present invention has the advantages of being multi-task aware and providing full symbolic support in a GUI interface. In one embodiment, the debugger 440 has the advantage that it has access to, and knowledge, of the IA-SPOX and/or SPOX environment The task switch handler 670 supports breakpoints within task code that is specific to an executing instance of that task. This is critical in debugging applications where a given task will have many instances. The IA-SPOX environment is highly multi-threaded. The convenience of checking for memory overwriting and failure to de-allocate is difficult for a system debugger to provide.

Another embodiment of the present invention can be implemented using the DSP debug API, the ULTRA front-end and Windows NT. In this embodiment, a translation layer to map Win32 API calls to the DSP debug API is used.

INITIALIZATION OF THE DEBUGGER

Figure 7:
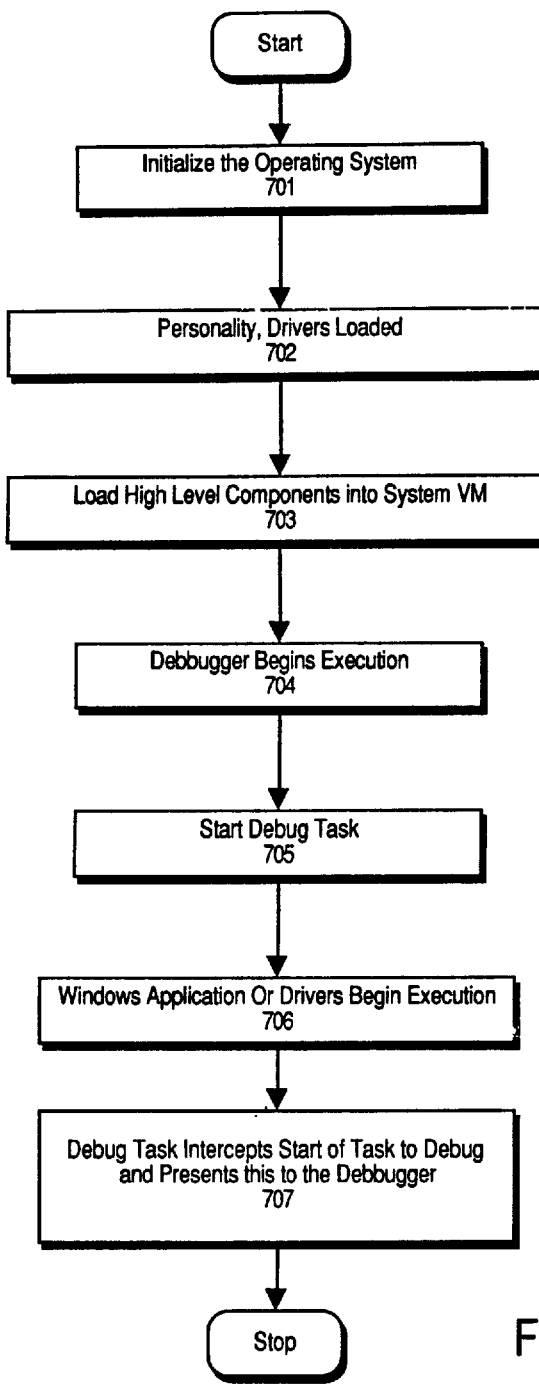
FIG. 7 illustrates a method of initializing a debugger.

FIG. 7 illustrates one embodiment of a method of initializing the debugger. This embodiment can be executed on the computer system of FIG. 1.

At step 701, the operating system is initialized. For example, the user enters "win" and the Windows operating system 303 takes control of the computer system. The Windows operating system 303 loads its kernel including all virtual device drivers (VxDs).

At step 702, the RTW VxD 404 is loaded and initializes itself in response to messages from the Windows VMM. RTW VxD 404 makes itself ready to load a personality. The IA-SPOX host side VxD 405 (that is the host side of the personality) is also loaded by Windows VMM 430. During the IA-SPOX VxD's 405 initialization, it requests that real-time Windows load the real-time Windows personality RTE side 215.

At step 703, when all VxDs have been loaded, the Windows operating system 303 begins to load its higher level components and their related drivers into the system VM 305. One of these drivers is the DSP interface DLL 452. The DSP interface DLL 452 requests, via the IA-SPOX host side VxD 405, that the IA-SPOX host side personality 405 start a task to communicate commands to and from the system VM 305.

At step 704, the user launches the debugger 440 from the Windows Program Manager. This loads the DSP debug module 442 that provides the debug API 441.

At step 705, the debugger 440 requests via the DSP debug API 441 that IA-SPOX (the SPOX kernel shell 492 and the SPOX debug extension 447) start a special debug task 444 and prepare to monitor and debug another task. The debug task 444 installs exception handlers and otherwise prepares to monitor RTE application tasks, such as application task 448.

At step 706, the user then launches the Windows application 202, or driver, that uses one or more IA-SPOX tasks (e.g. application task 448).

At step 707, the debug task 444 intercepts the start of that IA-SPOX task and presents it to the user for debugging.

USING A BREAKPOINT

Figure 8:
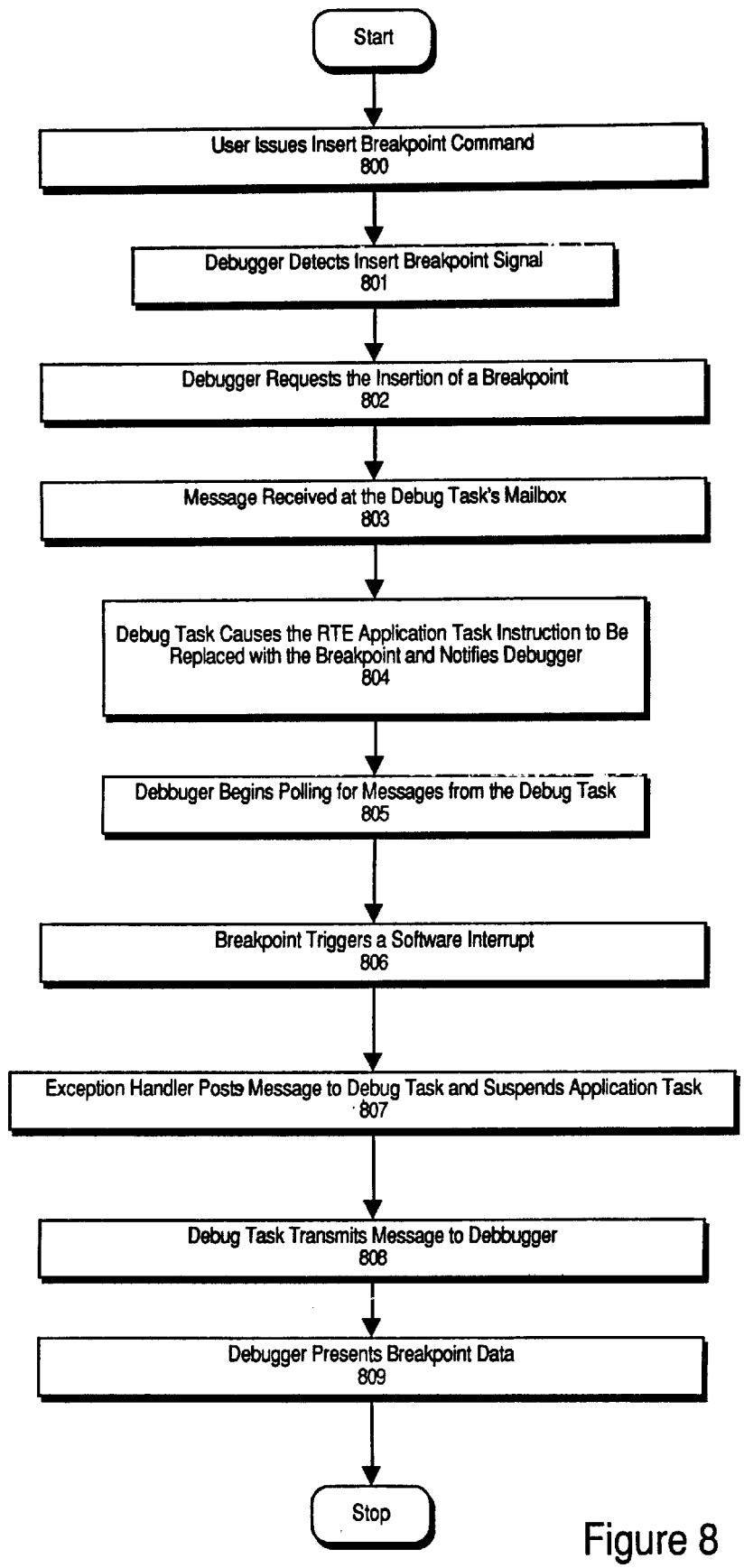
FIG. 8 illustrates one embodiment of inserting, and using, a breakpoint.

FIG. 8 illustrates one embodiment of inserting, and using, a breakpoint. This embodiment can be executed on the computer system of FIG. 1.

At step 800, the user issues an insert breakpoint command to the debugger 444.

At step 801, the debugger 440 detects the insert breakpoint command as an insert breakpoint signal.

At step 802, the debugger 440 uses a DSP debug API 441 function to request insertion of breakpoint.

At step 803, the insert breakpoint message is sent by the DSP debug module 442 to the debug task mailbox 620, via the IA-SPOX VxD 405, RTW VxD 404 and IA-SPOX kernel (SPOX kernel shell 492 and SPOX debug extension 447).

At step 804, the debug task 444 causes an instruction in the RTE application task 448 to be replaced by a breakpoint instruction. The debug task 444 notifies the task switch handler 670, using a shared data structure, that the breakpoint is to be inserted into (or removed from) 475 the specified application task 482. The debug task 444, using the debug task mailbox 620, replies to the message from the debugger 440 indicating the debug task 444 has caused the breakpoint to be inserted. In one embodiment, the task switch handler 670 places the insert breakpoint information into a breakpoint list. In another embodiment, the shared data structure is the breakpoint list. When the application task 448 is next executed, the task switch handler 670, by referring to the breakpoint list, replaces the RTE application task 448 instruction with the breakpoint.

At step 805, the debugger 440 begins to periodically poll for messages from the debug task.

At step 806, the client application 446 begins executing and the application task 448 executes the breakpoint instruction, thereby triggering a software interrupt. Note that the following will occur for other types of exceptions as well, causing other interrupts (like a hardware interrupt). For example, if some other fault occurs and the exception is triggered, then the following will occur for that exception. This ensures that the debugger 440 application is notified of any exceptions. This allows a user to debug the application task 448 using the debugger 440 that is executing on the same processor that is executing the application task 448. The interrupt causes the Windows VMM 430 to invoke a corresponding exception handler 650, installed by the debug task 444.

At step 807, the exception handler 650 posts a message to the debug task mailbox 620. The exception handler 650 uses the multi-tasking features of RTW to suspend the application task 448 and switch to the debug task 444.

At step 808, when the debug task 444 is next polled by the debugger, the debug task 444 transmits a message indicating that the breakpoint has been reached. The message provides data describing the exception and the state of the application task 448.

At step 809, the debugger 440 presents the data describing the task at the breakpoint to the user.

A debugger that supports the debugging of real-time tasks in a non-real-time operating system has been described.

What is claimed is:

1. A computer system comprising:
   a memory element;
   a processor coupled to said memory element;
   an operating system running on said processor, said operating system including a virtual device driver running a multi-tasking real-time environment embedded within said operating system;
   a debugger with a graphical user interface interacting with said multi-tasking real-time environment to allow use of said graphical user interface to debug test task, the debugger being at a first privilege level; and
   a debug task to manipulate states of said test task, said debug task and said test task running in the multi-tasking real-time environment at a second privilege level.

2. The computer system of claim 1 wherein said communication between said debugger and said multi-tasking real-time environment includes commands and data, said communication accomplished using a task mailbox which contains commands from said debugger graphical user interface and said data from said debug task.

3. The computer system of claim 1 wherein said multi-tasking real-time environment includes a multi-tasking kernel.

4. The computer system of claim 1 wherein said virtual device driver operates within a 0 privilege level.

5. The computer system of claim 1 wherein said debug task suspends said test task when an exception associated with said test task is detected.

6. The computer system of claim 5 wherein said multi-tasking real-time environment further includes an exception handler, and wherein said exception handler is for communicating said exception to said debug task.

7. The computer system of claim 1 wherein said operating system is a Windows operating system.

8. A method of debugging a test task in a computer system, said computer system executing instructions of an operating system including an outer operating system and a virtual device driver running a multi-tasking real-time environment embedded within said outer operating system, said method comprising the steps of:
   initializing said virtual device driver in said operating system;
   operating a debugger application with a graphical user interface in said outer operating system at a first privilege level, said debugger interacting with said multi-tasking real time environment;

executing a debug task in said multi-tasking real time environment of said device driver, said debug task intercepting the execution of said test task operating in said multi-tasking real time environment at a second privilege level;

communicating information regarding the execution of said test task to said debugger application via said virtual device driver; and utilizing said information to monitor and manipulate states of said test task using said graphical user interface of said debugger application running in said outer operating system.

9. The method of claim 8 further comprising the steps of:

notifying a mailbox associated with said debug task, that said test task is executing;

said debug task storing relevant information in said mailbox;

said debugger application polling said mailbox, via said virtual device driver; and said debugger application accessing said information in response to said polling.

10. The method of claim 8 wherein said step of operating said debugger application includes the step of executing a DSP debug module which provides said debugger application with an application program interface to said virtual device driver.

11. The method of claim 8 wherein said debug task includes exception handlers to monitor said test task.

12. A method of detecting a trap in an operating system using a graphical user interface, said method comprising the steps of:

executing an instruction in a test task executing in an embedded multi-tasking real time environment at a first privilege level, said instruction in said test task causing said trap;

identifying said trap and communicating a message to a debug task executing on said computer system, said debug task manipulating states of said test task;

halting the execution of said test task;

preparing information about said test task when said instruction was executed;

communicating said information from a virtual device driver to a debugger interacting with said multi-tasking real time environment, said debugger operating in said computer system at a second privilege level; and displaying debugger operation in a graphical user interface output.

13. The method of claim 12 wherein said instruction in said test task corresponds to a breakpoint, said method further comprising the steps of:

detecting a command to insert said breakpoint;

causing an insert breakpoint message to be transmitted to said debug task; and replacing said instruction in said test task with said breakpoint.

14. The method of claim 13 further comprising the steps of:

communicating that said instruction has been replaced; and polling a mailbox for said information.

15. The method of claim 13 wherein said replacing of said instructions comprises the steps of:

communicating an insert breakpoint command to a task switch handler, said task switch handler running in said computer system.

16. The method of claim 12 wherein said trap is a hardware trap.

17. The method of claim 8 wherein said multi-tasking real time environment includes a multi-tasking kernel and wherein said debug task and said test task are each being managed by said multi-tasking kernel.

18. The method of claim 8 wherein said virtual device driver operates within a 0 privilege level, and said debug task is a higher priority task than said test task.

19. The computer system of claim 1 wherein said debug task is at a higher priority task than said test task.

* * * * *

UNITED STATES PATENT AND TRADEMARK OFFICE
CERTIFICATE OF CORRECTION

PATENT NO. : 5,889,988
DATED : March 30, 1999
INVENTOR(S) : Held

It is certified that error appears in the above-identified patent and that said Letters Patent is hereby corrected as shown below:

Column 3,
Line 17, delete "SPOXXDS" and insert -- SPOX/XDS --.

Column 10,
Line 38, insert -- . --.

Column 12,
Line 29, insert -- a --.

Signed and Sealed this

Twenty-fifth Day of November, 2003

JAMES E. ROGAN
*Director of the United States Patent and Trademark Office*